June 16, 1936.  W. H. MUSSEY  2,044,733
VEHICLE HEATING SYSTEM
Filed March 12, 1934
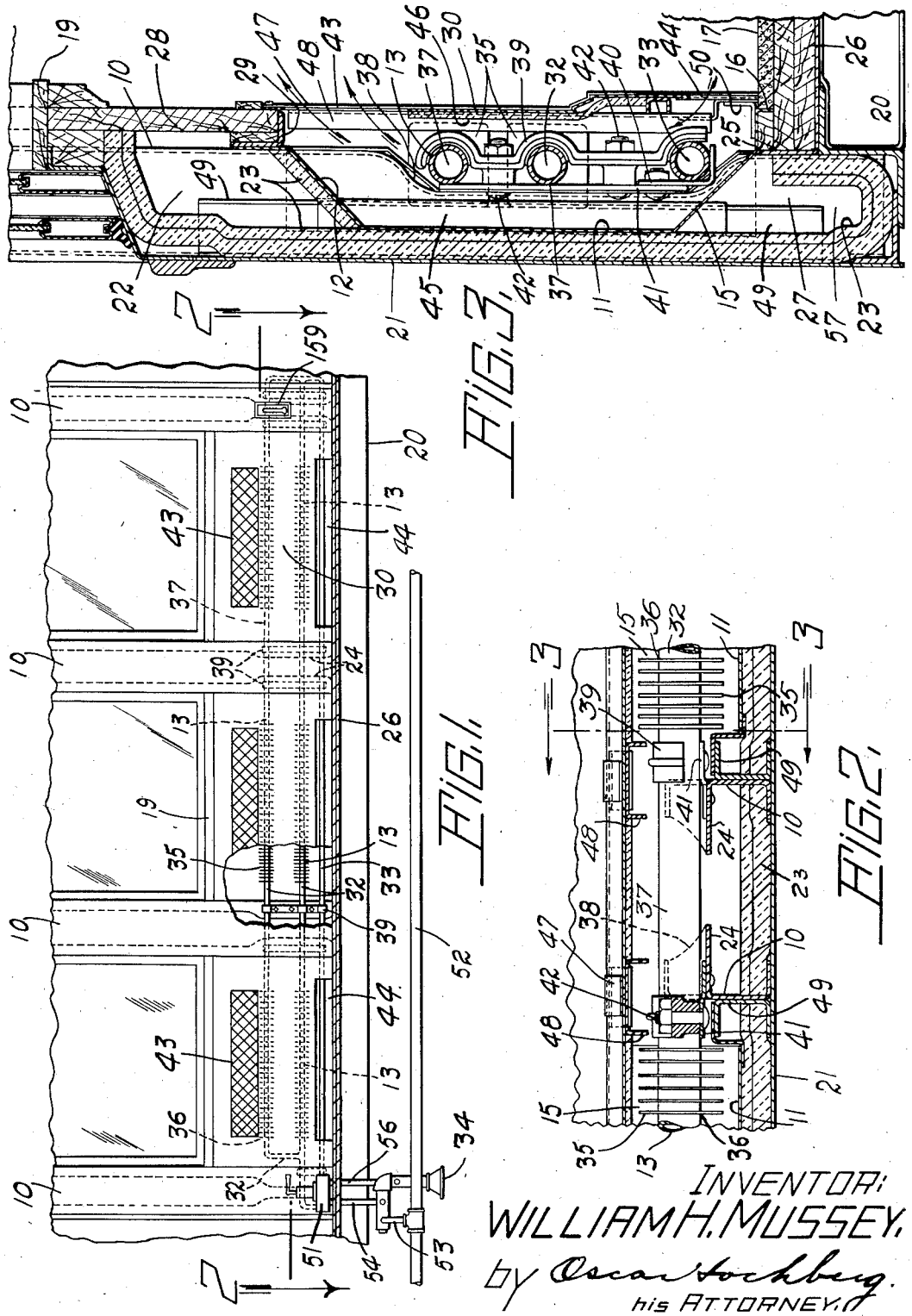
INVENTOR:
WILLIAM H. MUSSEY.
by Oscar Hochberg
his ATTORNEY.

Patented June 16, 1936

2,044,733

UNITED STATES PATENT OFFICE 2,044,733

VEHICLE HEATING SYSTEM

William H. Mussey, Chicago, Ill., assignor to Pullman-Standard Car Manufacturing Company, Chicago, Ill., a corporation of Delaware Application March 12, 1934, Serial No. 715,069

2 Claims. (Cl. 237—45)

This application is a continuation in part of my pending application Serial No. 433,302 filed March 5, 1930, allowed November 29, 1933.

The invention relates generally to heating installations in railway cars and other vehicles, and contemplates the placement of radiators behind the wainscoting and between posts of the car framing. The invention further contemplates the provision of means associated with the respective radiators for drawing the relatively cool air to be heated from adjacent the floor within the car and emitting the heated air in localized areas throughout the car interior.

The principal object of the invention is to utilize the heretofore unoccupied space between the supporting posts of the car framing, and between the girder side and inside lining or wainscoting, for the concealment of radiators and associated deflector units, so that the space devoted to the passenger shall be free from the hampering presence of coils and coil housings commonly associated with the systems heretofore employed.

A further object is so to correlate the framing structure and the several radiators and deflector units that the heating coils and connecting pipes may be removably mounted and made accessible for inspection.

A further and important object is so to dispose the several radiators as to cause the relatively cool air drawn from the car interior to be swept across the full heat radiating field of the respective radiators.

The foregoing and other objects are attained by the construction illustrated in the accompanying drawing, in which—

Figure 1 is an elevational view of the heating system in position within the wall of a railway car, the embodiment indicated involving a unit of three banks of radiators;

Figure 2 is a horizontal section taken on the line 2—2 of Figure 1 on a larger scale showing the mounting of the system upon the supporting posts of the car framing; and Figure 3 is a vertical, sectional view taken on the line 3—3 of Figure 2 showing the wainscoting panel covering the radiator pockets and indented posts and inner car wall formed with air intake and emission openings and the radiators supported upon the posts.

In the practice of the invention, the space between the channel-shaped posts 10 at the radiator positions is fitted with a deflector plate 11 having its upper wall 12 formed to overhang adjacent radiator 13 and its lower portion designed to extend beneath the radiator as best indicated in Figures 2 and 3. In the embodiment shown, the lower portion of the deflector is provided with a sloping deflecting face 15, with its exposed outer edge shaped to provide an abutment 16 for the bordering margin of the floor covering 17, and secured to the inner side wall finish as indicated at 50 in Figure 3.

To prevent conduction of the radiated heat to the underframe 20, girder side 21, and window sills 19, the space 22 between said parts and deflector plate 11 is lined with heat insulating material 23 secured in any approved fashion. As indicated in Figure 3, the deflector plate 11 is extended downwardly to the sloping face plate 15 of the deflector, then laterally to provide flange 25 extending in overlapping relation with the floor 26 of the car, to form a dead air space 27 designed to prevent undue chilling of the air received at the intake hereinafter referred to, and further to insulate the car interior from the relatively cold space between the floor and girder wall.

At its upper side the deflector unit is secured to wainscoting 28 and to the framing of the car through the medium of the overhanging wall 12 secured along its marginal edge to adjacent framing strips 29 extending between and secured to the posts 10 and to the lining or wainscoting 28 supported thereby. Thus arranged, the deflector prevents the heated air rising from the radiator from entering that portion of space 22 above the deflector part 12 and directs all of the air heated to the car interior through emission openings hereinafter described.

The radiator units employed are proportioned to the heating requirements, and in Figure 1 are indicated as comprising a plurality of coils 13 connected by feed pipes 32 and drain pipe 33 leading to regulating valve 34 beneath the car. The radiating field of the several coils 13 is provided by the fin plates 35 firmly secured to the coil tubing, as indicated in Figures 2 and 3, with their exposed faces disposed vertically to permit passage of the air stream between them.

As shown in Figures 2 and 3, these fins provide localized radiators 36 in pipe lines 37 in cases where space is limited. Radiators thus interposed in the pipe lines 37 may be supported directly upon the several posts 10 as shown in Figures 1, 2 and 3, and the posts indented as at 38 to permit the pipe lines to be set within the planes of the posts to provide sufficient clearance between the pipe lines and wainscoting 30 and to avoid piercing the posts. In Figures 1, 2 and 3, the radiator pipes are supported by means of clamps 39 secured to the indented widened flanges 24 of the posts 10 through the medium of the attaching plates 41. At the narrow section of the post resulting from the indenting thereof as at 38, a channel member 49 is provided for reinforcing the post at such reduced portion and which may be secured thereto by any suitable means, as by welding or riveting, to insure uniformity of section and strength with the portions 57 of the posts extending below the floor line and immediately above the indented portion 38 as best shown in Figure 3.

To the attaching plates at the bottom of the radiators, brackets 40 are secured by bolts or otherwise, and provide substantial support for the radiator pipes 13 which are held in proper operating relation to deflector plate 11 and wainscoting 30 by clamps 39 fastened by bolts 42 to the attaching plate 41.

With the radiators, deflectors, and associated framing elements assembled as above described, the installation is completed by the application, in the present embodiment, of wainscoting sections 30 having air emission openings 43 and lower air intake openings 44, with a relatively broad expanse of wainscoting area between them, as best shown in Figures 1 and 2. The respective wainscoting portions intermediate the air emission and intake openings 43 and 44 are of relatively substantial proportions for the purpose of providing with their associated framing and deflector assemblies, a continuous air duct 45 having its terminals at such openings. The radiator pipe 13 installed within the duct is designed to induce circulation of the air therein to the end that the air heated by the radiator will be forced through emission opening 43 as the relatively cool air drawn in at the intake opening 44 displaces the air expelled.

Between companion openings, the wainscoting areas, upon their respective inner faces, are insulated from the heat of adjacent radiators 13 by a layer of fibrous material 46 to prevent absorption of heat by the wainscoting. It will be noted, in the drawings, that the fixed portions 28 of the wainscoting are indicated as being of wood and extending down to the emission openings 43, and from this point to the floor the removable portion of the wainscoting 30 is shown as metal extending downwardly flush with the inner face of the fixed wainscoting, whereby a free passage is provided for the circulation of air to the adjacent side of pipes 13 to supplement the passage at the rear provided by the recessed reflector plate 11.

That portion of the wainscoting 30 at the radiator positions is removably secured to adjacent fixed portions 28 and to the floor or side wall structure preferably through the medium of attaching channel pieces 48 and battens 47 secured to the angle 50 and fixed portions 28 of the wainscoting, best shown in Figures 2 and 3. As indicated in Figure 3, the removable portions of the wainscoting rest upon the floor of the car and are held along their upper margins preferably by screws taking the fixed portions 28 of the wainscoting beneath the window sills 19, so that by outward movement of the panel after removing the fastening means taking channel pieces 48, the panel may be disengaged and removed and the radiator and remaining duct parts exposed. From the disclosure it should be noted that the ducts 45 may terminate in openings in the plane of the wainscoting 30 or at an angle thereto, as desired. As indicated in Fig. 3, the lower sloping portion of the duct 45 is adapted to direct all dirt and other matter finding its way to the duct towards the intake opening 44 to avoid accumulation thereof and facilitate removal.

In operation, suitable provision is made to properly regulate the temperature of the car interior by automatic heat control devices 159 operatively connected with suitable regulating valves of the system and not here involved. Assuming the car to be cold and it is desired to turn on the heat, the control valve 51 in Figure 1 is manipulated to admit the heating agent to the pipes 13 behind the wainscoting 30, whereupon the air enveloping the radiators becomes heated and begins to rise and is displaced by colder air admitted through intake openings 44 of the ducts as the heated air is discharged thru emission openings 43 as indicated by the arrows, thereby creating a circulation of air of substantial proportions in the several ducts 45 concealed at strategic points in the walls of the car, whereby the heat of the radiators housed in the ducts is taken up by the air sweeping across the radiating field of the pipes and conveyed thus indirectly to the car.

As best shown in Figure 1, the heating system herein exemplified is of the well known vapor type and in the present embodiment high pressure steam from the main train line 52 enters the vapor regulator 34 through branch pipe 53, where the pressure is reduced to atmospheric, thence to the control valve 51 thru lead-in pipe 54, from where the vapor is fed to the various radiators and pipe coils 13 thru feed pipes 32 and then back to control valve 51 thru the return pipe 33 and finally to the vapor regulator 34 again thru pipe 56, where, at necessary intervals, the condensation collecting therein is automatically drained off.

By placing the several radiators within ducts 45 vertically arranged at predetermined points in the car walls, a more equable and efficient distribution of heat is possible than that obtainable from the direct radiation systems heretofore employed. The arrangement lends itself to the installation of such ducts in walls, partitions, or bulkheads of the car large enough to accommodate a radiator.

What I claim is:—

1. In combination with the side wall of a railway car comprising a plurality of spaced vertical posts each having an inner flange and a web extended therefrom at a substantial angle to the length of the car, said web being straight throughout its height and being indented near its lower end with said inner flange wider at the indented portion, inner and outer wall members carried by the posts so as to enclose a plurality of separated wall spaces open to the car interior, radiating pipes secured to said posts at the indented portions thereof, deflector plates mounted behind and in spaced relation to the pipes within said open spaces and secured at their upper sides to respectively adjacent inner wall members above the pipes so as to provide an air circulation passage behind the pipes, said pipes being spaced outwardly from the inner wall to provide an air circulation pasage in front of the pipes, said inner wall portions being provided with inlet and outlet passages respectively below and above the pipes, and means on those portions of the pipes adjacent the circulation passages to increase the heat transmitting surface of said portions of the pipes.

2. In combination with the side wall of a railway car comprising a plurality of spaced vertical posts each having an inner flange and a web extended therefrom at a substantial angle to the length of the car, said web being straight throughout its height and being indented near its lower end with said inner flange wider at the indented portion, inner and outer wall members carried by the posts so as to enclose a plurality of separated wall spaces open to the car interior, radiating pipes secured to said widened flanges at the indented portions of the posts, deflector plates mounted behind and in spaced relation to the pipes within said open spaces and secured along their upper sides to respectively adjacent inner wall members above the pipes so as to provide an air circulation passage behind the pipes, said pipes being spaced outwardly from the inner wall to provide an air circulation passage in front of the pipes, said inner wall portions being provided with inlet and outlet passages respectively below and above the pipes, and means on those portions of the pipes adjacent the circulation passages to increase the heat transmitting surface of said portions of the pipes.

WILLIAM H. MUSSEY.